(12) United States Patent
Elam et al.

(10) Patent No.: US 11,435,114 B2
(45) Date of Patent: *Sep. 6, 2022

(54) REFRACTORY SOLAR SELECTIVE COATINGS

(71) Applicant: UChicago Argonne, LLC, Chicago, IL (US)

(72) Inventors: Jeffrey W. Elam, Elmhurst, IL (US); Anil U. Mane, Downers Grove, IL (US); Angel Yanguas-Gil, Naperville, IL (US); Joseph A. Libera, Clarendon Hills, IL (US)

(73) Assignee: UChicago Argonne, LLC, Chicago, IL (US)

( * ) Notice: Subject to any disclaimer, the term of this patent is extended or adjusted under 35 U.S.C. 154(b) by 372 days.

This patent is subject to a terminal disclaimer.

(21) Appl. No.: 15/017,619

(22) Filed: Feb. 6, 2016

(65) Prior Publication Data

US 2017/0229593 A1 Aug. 10, 2017

Related U.S. Application Data

(63) Continuation-in-part of application No. 15/017,548, filed on Feb. 5, 2016.

(51) Int. Cl.
*F24S 70/225* (2018.01)
*F24S 20/20* (2018.01)

(52) U.S. Cl.
CPC ............ *F24S 70/225* (2018.05); *F24S 20/20* (2018.05); *Y02E 10/40* (2013.01)

(58) Field of Classification Search
CPC ......... F24S 70/225; F24S 20/20; Y02E 10/40; C23C 16/45525; C23C 16/45527; Y20E 10/40; G02B 1/005
See application file for complete search history.

(56) References Cited

U.S. PATENT DOCUMENTS 7,722,421 B2 * 5/2010 Sommerer ............ G02B 5/206
  313/634
8,921,799 B2 12/2014 Elam et al.
8,969,823 B2 3/2015 Elam et al.
(Continued)

OTHER PUBLICATIONS

Knez, Synthesis and Surface Engineering of Complex Nanostructures by Atomic Layer Deposition, Advanced Materials, 2007, vol. 19, pp. 3425-3438. (Year: 2007).*

(Continued)

*Primary Examiner* — Monique R Jackson
(74) *Attorney, Agent, or Firm* — Foley & Lardner LLP

(57) ABSTRACT

Selective receiver coatings provide high performance for concentrated solar power applications. The solar selective coating provides high solar absorptivity (90% or greater) with low IR emissivity (0.1 or less) while maintaining stability at temperatures greater than 700° C. The coating comprises a composite of a mesoporous photonic matrix with a conformal optical coating. One example composite coating includes a mesoporous photonic coating comprising a plurality of particles having sizes between 100 nm and 2000 nm, and a conformal optical coating formed by Atomic Layer Deposition (ALD) that infiltrates the mesoporous structure of the photonic coating and comprises metal nanoparticles and an amorphous dielectric matrix.

8 Claims, 7 Drawing Sheets

(56) References Cited

U.S. PATENT DOCUMENTS

| 9,523,152 | B2* | 12/2016 | Chou | H02S 40/44 |
|---|---|---|---|---|
| 2006/0170334 | A1 | 8/2006 | Etheridge et al. | |
| 2011/0284059 | A1* | 11/2011 | Celanovic | G05F 1/67 |
| | | | | 136/253 |
| 2011/0312080 | A1* | 12/2011 | Hatton | A61L 27/40 |
| | | | | 435/289.1 |
| 2013/0280546 | A1* | 10/2013 | Elam | C23C 16/30 |
| | | | | 428/472.2 |
| 2015/0107582 | A1* | 4/2015 | Jin | G02B 5/22 |
| | | | | 126/676 |
| 2016/0144350 | A1* | 5/2016 | Aizenberg | C04B 38/0096 |
| | | | | 502/159 |

OTHER PUBLICATIONS

Bermel, Chapter 7. Selective Solar Absorbers, Annual Review of Heat Transfer XV, 2012, Begell House, Reading, CT, pp. 231-254. (Year: 2012).*

Arpin, et al., Three-dimensional self-assembled photonic crystals with high temperature stability for thermal emission modification, Nature Communication, Oct. 16, 2013, 8 pages.

George, Atomic Layer Deposition: An Overview, Chemical Reviews, 2010, 110(1), Nov. 30, 2009, pp. 111-131.

Hall, et al., Solar Selective Coatings for Concentrating, Advanced Materials & Processes, Jan. 2012, pp. 28-32.

Hischeir et al., A Modular Ceramic Cavity-Receiver for High-Temperature High-Concentration Solar Applications, Journal of Solar Energy Engineering Feb. 2012, vol. 134, 6 pages.

Mane et al., An atomic layer deposition method to fabricate economical and robust large area microchannel plates for photodetectors, Proceedings of the 2nd International Conference on Technology and Instrumentation in Particle Physics (TIPP 2011), Physics Procedia 37, Oct. 2012, 722-732.

Mane et al., Atomic Layer Deposition of W:Al2O3 Nanocomposite Films with Tunable Resistivity; CVD Chemical Vapor Deposition, vol. 19, Issue 4-6, Jun. 2013, pp. 189-193.

Mane, et al.; Refractory Nanoporous Materials Fabricated Using Tungsten Atomic Layer Deposition on Silica Aerogels; Chemistry of Materials, Feb. 14, 2011, 25 pages.

Setiet-Fernandez et al., First spectral emissivity study of a solar selective coating in the 150-600 C temperature range, Solar Energy Materials and Solar Cells, Jul. 2013, pp. 390-395.

Williams, et al., Fabrication of Transparent-Conducting-Oxide-Coated Inverse Opals as Mesostructured Architectures for Electrocatalysis Applications: A Case Study with NiO; Applied Materials & Interfaces, 6 (15); Jul. 17, 2014; pp. 12290-12294.

Sechrist, et al., "Modification of Opal Photonic Crystals Using Al2O3 Atomic Layer Deposition," Chemistry of Materials 18(15), pp. 3562-3570 (2006).

Sechrist, "One-dimensional and three-dimensional photonic crystals created using atomic layer deposition," University of Colorado at Boulder, ProQuest Dissertations Publishing, 24 pages (2006).

* cited by examiner

REFRACTORY SOLAR SELECTIVE COATINGS

CROSS-REFERENCE TO RELATED APPLICATIONS

This application is a Continuation-in-Part of U.S. application Ser. No. 15/017,548, filed Feb. 5, 2016 the disclosure of which is incorporated herein by reference in its entirety.

STATEMENT OF GOVERNMENT INTEREST

The United States Government has rights in the invention described herein pursuant to Contract No. DE-AC02-06CH11357 between the United States Department of Energy and UChicago Argonne, LLC, as operator of Argonne National Laboratory.

FIELD OF THE INVENTION

The present invention generally relates to coatings, specifically to refractory solar selecting coatings.

BACKGROUND OF THE INVENTION

Harvesting energy from the Sun requires the transformation of the solar energy into a useful form, typically electricity or heat. Some applications seek to leverage optical technologies such as concentrators to focus a large amount of light into a relatively small processing device. Such "concentrated solar" technologies include small scale and large scale devices. This invention focuses on technologies that harvest solar energy into thermal energy, including, but not limited to, concentrating solar thermal applications. These techniques can be considered a two-step process: solar energy is first transformed into thermal energy. This thermal energy can be stored and later converted into electricity.

One key challenge of such two-step approaches is the opposite role that temperature plays on the efficiency of the process in each of the two steps. The efficiency of converting thermal energy into electricity increases with the temperature of the medium used to store that thermal energy. Consequently, achieving high temperatures in the receiving towers would allow higher temperatures in the storage media, therefore increasing the efficiency of the conversion of the thermal energy into electricity. However, the efficiency of the process of harvesting solar energy into thermal energy decreases with increasing temperature: as more solar energy is concentrated in a small spot, the temperature increases and a fraction of the energy is lost as thermal radiation. The reason for this is that the power lost to radiation of a black object evolves as T to the fourth power. The state of the art to overcome this problem is to coat the areas receiving the concentrated solar light with a material with very specific properties: the ideal material is one that can absorb all the visible light, but that blocks all the thermal energy to minimize the radiation losses. This material should also be able to withstand temperatures in excess of 700° C. without any loss in its properties. Current state of the art coatings are unable to meet these three goals: black paint formulations like Pyromark 2500 have a high thermal emissivity. Existing absorber coatings used in solar devices, such as ceramic-metal composites ("cermets"), have maximum operating temperatures well below 700° C. or exhibit performance drop-offs at high temperatures resulting in poor solar absorbance, typically below 95%.

A further problem with current absorber coatings is that many lack the ability to be tunable. The inability to tune the characteristics of the absorber coatings results in reduced efficiencies and a failure to optimize for a given application. This is particularly acute in large-scale concentrated solar power plants where each installation may involve a bespoke approach.

Another way in which it is possible to tune the optical properties of the materials is by the use of photonic crystals and photonic structures. Photonic crystals are nanostructured materials, either ordered or disordered, that are designed or sculpted in such a way that the optical properties are different from those of the fully dense material. Consequently, by imparting structure to a given material, it is possible to access a wider range of optical properties.

Existing coatings and methods of applying absorber coatings are not able to coat conformally complex structures of sizes in the range between tens of nanometers to tens of microns. Coatings such as black oxide and cermet are not conformal coatings. The inability to provide a conformal coating limits the design parameters of the device and how the coating can be applied to an existing scaffold to create a photonic structure that would allow to tune the properties even further.

SUMMARY OF THE INVENTION

One embodiment of the invention relates to a photonic device. A photonic construct comprising a photonic coating on a substrate. The photonic coating comprising a plurality of nanoparticles having sizes between 100 nm and 2000 nm, the photonic coating having a mesoporous structure. An optical coating deposited on the photonic coating and infiltrating the mesoporous structure, the optical coating comprising a plurality of nanoparticles having sizes between 0.1 nm and 10 nm and an amorphous matrix. The photonic construct has a solar absorptivity ≥90% and an IR emissivity ≤0.05 at a temperature above 720° C.

One embodiment of the invention relates to method of making a photonic device. The method comprises: applying a photonic coating comprising a plurality of nanoparticles having sizes between 100 nm and 2000 nm, the photonic coating having a mesoporous structure; infiltrating the photonic coating with an optical coating, the optical coating comprising a plurality of nanoparticles having sizes between 0.1 nm and 10 nm and an amorphous matrix. The photonic construct has a solar absorptivity ≥90% and an IR emissivity ≤0.05 at a temperature above 720° C.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 1A illustrates the absorber coating at the device scale. FIG. 1B illustrates the absorber coating at the 0.1-1 μm scale, coating is comprised of a photonic crystal with dimensions tuned to enhance solar absorption. FIG. 1C illustrates the absorber coating at the 1-10 nm scale, coating is a nanophase composite of optically absorbing nanoparticles in a transparent matrix.

DETAILED DESCRIPTION OF THE PREFERRED EMBODIMENTS

Figures 1A, 1B, 1C:
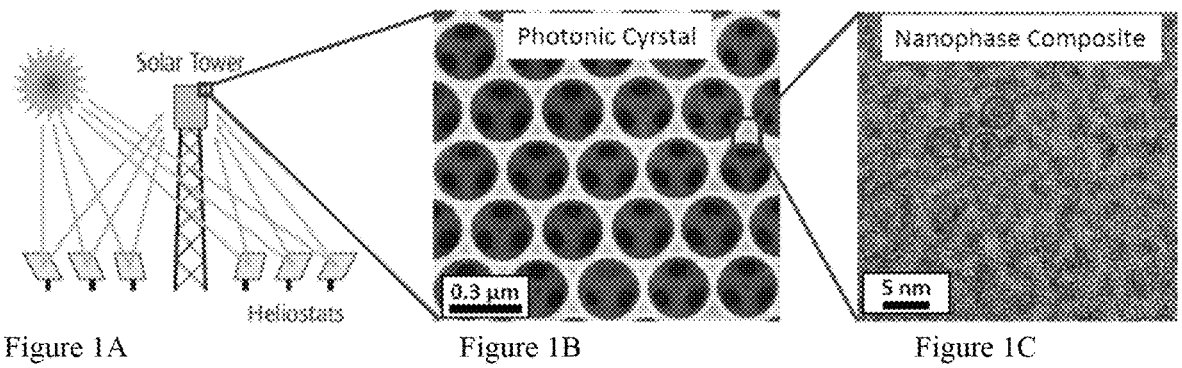
FIGS. 1A-C illustrates a selective absorber coating for concentrated solar power (CSP) receiver.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

One embodiment relates to methods and systems for a high-performance absorber coating. A particular embodiment relates to high-performance selective receiver coatings for concentrated solar power (CSP), for example capable of levelized cost of electricity of ≤6 ¢/kWhe. The system and methods utilize advances in photonic crystal fabrication and nanocomposite materials synthesis to achieve tunability of the optical properties of solar receiver coatings in the UV, visible, and infrared spectral regions and manufacture coatings having a photonic structure that withstands high operating temperatures in air (≥700° C., preferably, ≥720° C., or ≥800° C., or ≥900° C., or ≥800° C.) while maintaining a high solar absorptivity (≥90%, preferably ≥95%) and low IR emissivity (≤0.1, preferably ≤0.05).

The present invention describes the methods to create and apply refractory solar selective coatings. In one embodiment, the method comprises the following steps, A photonic coating is casted on a surface using self-assembly and/or sedimentation of colloidal suspensions of nanoparticles of sizes ranging between 100 nm and 2000 nm or a combination of particles of different sizes. Other preferred methods for the fabrication of this coating involve using spray and electrostatic methods. The photonic coatings can be manufactured using sol-gel, aerogel, xerogel, drop- and dip-casting methods, and 3D printing. These processes can make use of organically modified silicate precursors using monodisperse polystyrene and polymethylmethacrylate nanoparticles as sacrificial materials. The formation of a well-ordered structure is desired but it is not a requirement: subsequent steps can modify the optical properties to allow for a cut-off in the long-range order that is determined by the final optical properties of the coating. The mesoporosity of the film in a length scale between 0.1 and 2 microns is the target property of this layer. As used herein "mesoporous" means pores of a scale between nanoscale and macroscale, i.e. from 100 nm to 2000 nm. In one embodiment the properties of the particles are chosen according to their thermal stability and refractory nature of their constituent material. In another preferred embodiment, the composition of these particles is chosen so that they can be etched or dissolved using chemical methods at a later stage.

In a second step, this coating is infiltrated with an optical coating using Atomic Layer Deposition method. The composition of this layer is specifically designed to create a nanocomposite material comprising nanoparticles embedded into an amorphous matrix. The sizes of the nanoparticles range between 0.1 and 10 nm, with the size of the particles and the density of the particle determined by the choice of input parameters in the Atomic Layer Deposition process. The preferred embodiment involves a combination of refractory metal, metal carbide or metal oxide nanoparticles in a refractory dielectric matrix, with the size and composition of the particles controlled by the Atomic Layer Deposition process. In one embodiment, the nanoparticles comprise refractory materials, such as refractory carbides, refractory nitrides and refractory oxides, including consisting essentially of only such refractory materials. For instance, the refractory particles could be composed of W, Mo, Nb, Ta or Co, or the carbides, nitrides, or oxides of these metals. The refractory dielectric matrix could be composed of $Al_2O_3$, $SiO_2$, $Ta_2O_5$, $ZrO_2$, and MgO, or the corresponding nitrides of these metals. Desirable properties of the metallic particles include resistance to oxidation and a low rate of diffusion through the dielectric matrix at high temperatures of at least 700° C. Desirable properties of the dielectric matrix include a low oxygen permeability at high temperatures of at least 700° C. and a higher thermodynamic stability for the dielectric metal oxide or nitride compared to the corresponding oxide and nitride of the refractory particle metal. In other words, there should be no solid state redox reactions between the particles and the matrix at high temperatures. Unlike conventional cermets, the nanoparticles provide stability at high temperatures (stable at least at 700° C., preferably stable up to at least 1000° C.).

As a consequence of the aforementioned steps, the resulting absorber coating is engineered at multiple length scales (see, e.g., FIGS. 1A-C). In the 0.1-1 μm regime (FIG. 1B), the coating has a photonic crystal structure comprised of a periodic mesoporous array. At the 1-10 nm scale (FIG. 1C), the coatings are composed of optically absorbing nanoparticles in a transparent matrix where the size, spacing, and composition of the nanoparticles are tailored to tune the optical properties for high visible absorption and low IR emittance—similar to a cermet, but with dramatically enhanced thermal stability. More importantly, the tunability of the optical properties at both length scales allow the design of materials with tailored properties are used.

In one embodiment, a third step after the infiltration process is the etching of the sacrificial scaffold casted in the first step. This includes methods like etching (both gas phase and liquid phase) or chemical dissolution in a solvent. The resulting structure is a standalone coating with controlled nano and mesostructured, with the resulting unique optical properties. The presence of mesoporosity imparts the material additional resistance towards delamination due to the thermal cycling that receiver materials need to endure over their lifetime. This provides an additional advantage with respect to the state of the art. If this process is not carried out, then the resulting material is a mesoporous material composed of a refractory scaffold and the refractory tunable selective absorber material.

In another embodiment, the steps mentioned above are followed by the application of a protective coating by either Atomic Layer Deposition or chemical vapor deposition to mitigate the effect of oxidation and/or improve the mechanical properties.

In one embodiment, the process described above is applied directly to the receiver material by sequentially carrying out the coating of the mesoporous scaffold and the infiltration using Atomic Layer Deposition. In another embodiment, this process is carried out in a separate surface in a sequential fashion. In one preferred embodiment the mesoporous film and the ALD infiltration are carried out in a continuous process that allows the resulting film to be applied directly in the receiver. The choice of substrate includes the use of a sacrificial layer acting as a high temperature adhesive layer. This can be composed of a polymer or a soft metal that bonds to the receiver surface.

Table 1 below is a comparison of a target embodiment as described herein compared to known commercial absorbers. For applications in concentrated solar power (CSP), selective absorber coatings are required to maximize the fraction of sunlight absorbed while minimizing the amount of energy re-radiated at high operating temperatures. One figure of merit for judging the optical properties of CSP coatings is the efficiency for selective absorbers:

$$\eta_{sel} = \frac{\alpha_s \cdot Q - \varepsilon \sigma T^4}{Q} \quad (1)$$

where $\alpha_s$ and $\varepsilon$ are the absorptivity and emissivity of the coating, respectively, Q is irradiance on the receiver (W/m$^2$), $\sigma$ is the Stefan-Boltzmann constant, and T is the receiver surface temperature (K). For maximum thermal efficiency $\alpha_s$=1 over the solar spectrum and $\varepsilon$=0 in the infrared. The absorptivity can be calculated from:

$$\alpha_s = \frac{\int_0^\infty A(\lambda) G(\lambda) d\lambda}{\int_0^\infty G(\lambda) d\lambda} \quad (2)$$

where $\lambda$ is wavelength, $A(\lambda)$ is the absorbance of the film (equal to be 1-$R(\lambda)$, the reflectivity in the thick-film limit), and $G(\lambda)$ is the ASTM AM1.5D solar spectral irradiance. The emissivity can be calculated from:

$$\varepsilon = \frac{\int_0^\infty A(\lambda) L(T, \lambda) d\lambda}{\int_0^\infty L(T, \lambda) d\lambda} \quad (3)$$

where $L(T, \lambda)$ is the black body emission Planck function. Table 1 assumes Q=1000 kW/m$^2$ (~1000 suns). Italicized values indicate the temperature range is beyond the range of thermal stability for the material.

TABLE 1

| Absorber Coating | Solar Absorb | Thermal Emiss. | Select Solar Eff. 650° C. | 720° C. | 1000° C. | Max T (° C.) | Photonic Tunable? | Enhance | Conformal |
|---|---|---|---|---|---|---|---|---|---|
| Cermet (Mo—Si3 N4) | 0.93 | 0.017 | 0.93 | 0.93 | 0.93 | 400 | Y | N | N |
| Pyromark 2500 | 0.96 | 0.87 | 0.92 | 0.91 | 0.83 | 650 | N | N | N |
| Black Oxide | 0.92 | 0.80 | 0.89 | 0.88 | 0.80 | 750 | N | N | N |
| Target Embodiment | >0.95 | <0.10 | 0.95 | 0.94 | 0.93 | >1000 | Y | Y | Y |

The highest performing selective absorber coatings currently available use an absorber-reflector tandem comprised of a metal-ceramic composite (cermet) absorber layer consisting of small transition metal nanoparticles in a dielectric matrix on a highly IR-reflecting substrate (the reflector, typically silver). The coatings use 2-4 homogenous cermet layers or a single, graded cermet layer, and the stack is typically capped with an antireflective coating. Although these films are stable to 600° C. in vacuum, they degrade in air through oxidation of the metal nanoparticles. Moreover, these cermet multilayer coatings are prepared by physical vapor deposition which is strictly a line-of-site technique. Consequently, these coatings cannot be deposited inside of advanced receivers such as cylindrical cavities or on the outer surfaces of cylindrical receiver tubes.

In addition to these examples mentioned above, examples of photonic devices using Atomic Layer Deposition methods have been demonstrated in the prior art, but they do not have the high temperature resistance that the nanostructured materials proposed in the present invention have. For instance, recently tungsten 3D photonic structures with selective thermal emission were prepared by ALD having thermal stability up to 1400° C. in vacuum. These ALD coatings can easily be deposited on complex geometries, but the tungsten is not thermally stable in air, and lacks the very low emissivity of cermets. Alternative selective absorber materials with extreme high temperature durability and oxidation resistance, such as spinel oxide materials, are under development but thus far have not achieved high thermal efficiency.

As an example embodiment of this invention, a tunable absorber material was synthesized by Atomic Layer Deposition ("ALD") using the combination of a tungsten and aluminum oxide processes. Thin ALD W:Al$_2$O$_3$ composite films were prepared in a custom hot walled viscous flow ALD reactor described elsewhere and using previously published methods. The precursors trimethylamine ("TMA"), de-ionized H$_2$O, Si$_2$H$_6$, and WF$_6$ were used and maintained at room temperature. The deposition temperature was maintained at 200° C. where the W cycle ratio is defined as: W %=W/(W+Al$_2$O$_3$)×100 where W and Al$_2$O$_3$ are relative number of WF$_6$/Si$_2$H$_6$ and TMA/H$_2$O ALD cycles performed, respectively.

A systematic alteration in the optical properties of W:Al$_2$O$_3$ nanocomposite films can be achieved by precisely varying the W cycle percentage (W %) from 0 to 100% in Al$_2$O$_3$ during atomic layer deposition. The direct and indirect band energy of the nanocomposite materials decreases from 5.2 eV to 4.2 eV and from 3.3 eV to 1.8 eV, respectively, by increasing the W % from 10 to 40. X-Ray absorption spectroscopy reveals that for W % <50, W is present in both metallic and sub-oxide states whereas for W %≥50, only metallic W is seen. This transition from dielectric to metallic character at W %~50 is accompanied by an increase in the electrical and thermal conductivity and the disappearance of a clear bandgap in the absorption spectrum. The density of the films increases monotonically from 3.1 gm/cm$^3$ for pure Al$_2$O$_3$ to 17.1 gm/cm$^3$ for pure W whereas the surface roughness is greatest for the W %=50 films. The ALD W:Al$_2$O$_3$ nanocomposite films were comprised of metallic, 1-2 nm nanoparticles in an amorphous matrix. The W:Al$_2$O$_3$ nanocomposite films are thermally stable and show little change in optical properties upon annealing in air at 500° C.

Figure 7:
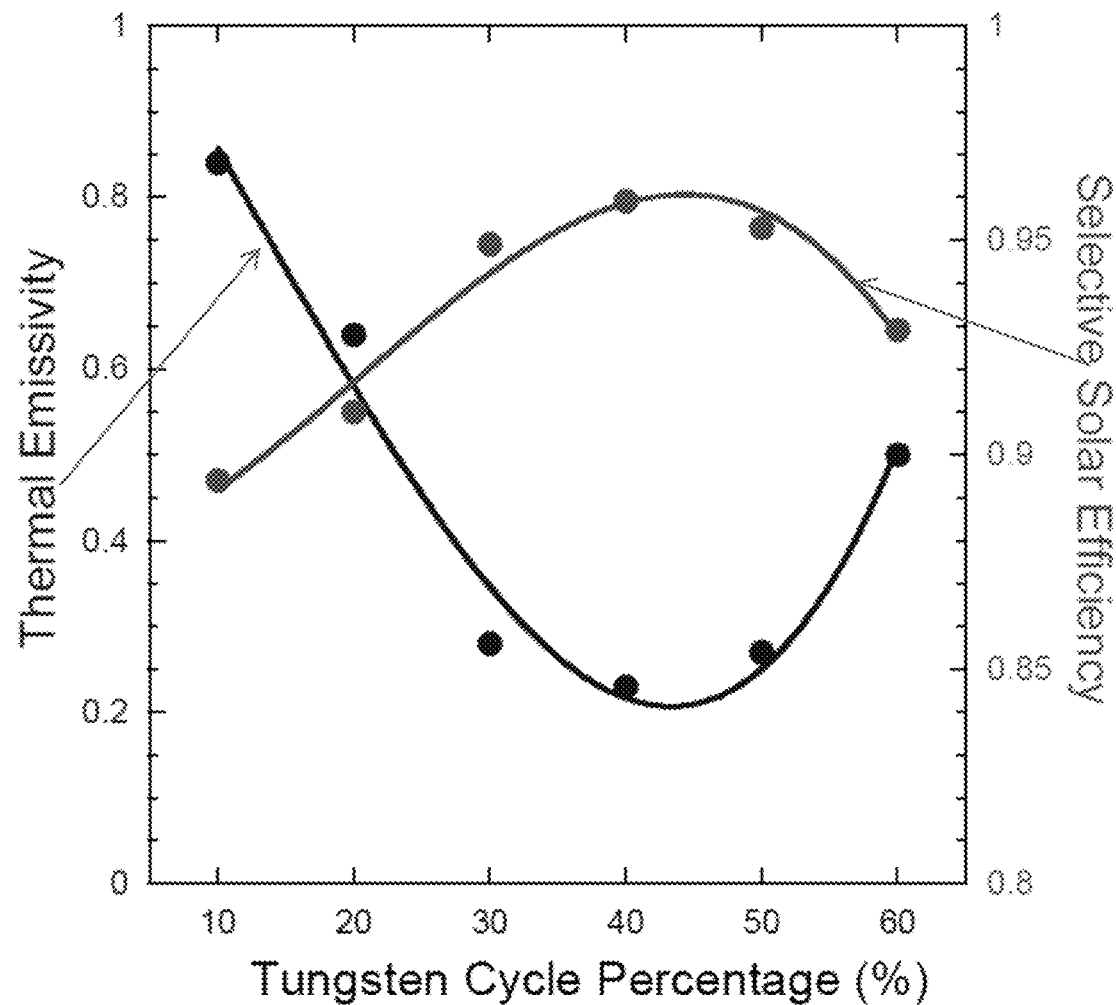
FIG. 7 is a graph showing thermal emissivity and selective solar efficiency for $W:Al_2O_3$ films, demonstrating both the tunability and the superior values compared with the state of the art.

The absorptivity, emissivity, and selective solar efficiency for embodiments of ALD W:Al$_2$O$_3$ nanocomposite films were calculated using Eqns. 1-3 and the absorption data of the aforementioned films. For these calculations, the film thickness was adjusted such that $\alpha_s$=0.98, and the absorption data was linearly extrapolated to longer wavelengths for the emissivity calculation. It was assumed that T=973K and Q=5×10$^5$ W/m$^2$ (500 Sun concentration factor). The calculated emissivity and selective solar efficiency values are shown in FIG. 7 versus the W cycle ratio. FIG. 7 reveals that at W %=10-20, the emissivity is relatively high and the efficiency relatively low. Due to their higher bandgap, these films are relatively transparent in the visible range and consequently must be very thick (30-45 microns) to achieve $\alpha_s$=0.98, and this increases the IR absorbance also. The W %=60 also has a high emissivity and low efficiency but for a different reason. The metallic nature of this film provides a relatively flat absorption spectrum and the IR absorption leads to a lower efficiency. However, for the films of intermediate metal content (W %=30-50), the combination of high visible absorption and low IR absorption yield low emissivities of ε=0.23-0.28, and high efficiencies of $\eta_{sel}$=0.95-0.96. For comparison, Pyromark 2500 (a common coating material for CSP receivers) shows $\eta_{sel}$=0.94 and ε=0.88 under these conditions[41]. These results suggest that the W %=30-50 films have favorable optical properties to serve as selective solar absorbing coatings for CSP receivers.

Figure 8:
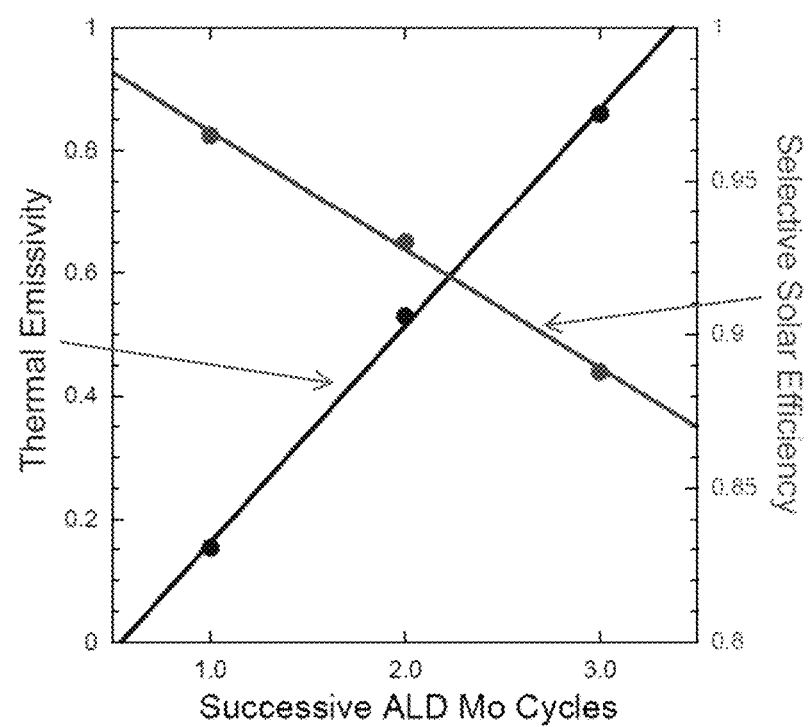
FIG. 8 is a graph showing thermal emissivity and selective solar efficiency for $Mo:Al_2O_3$ films, demonstrating both the tunability and the superior values compared with the state of the art.

Thin ALD Mo:Al$_2$O$_3$ composite films were prepared in a custom hot walled viscous flow ALD reactor described elsewhere and using previously published methods. The precursors TMA, de-ionized H$_2$O, Si$_2$H$_6$, and MoF$_6$ were used and maintained at room temperature. The deposition temperature was maintained at 200° C. The Mo cycle ratio was kept fixed at Mo %=10, and the number of successive Mo cycles was varied to be 1, 2, and 3. The absorptivity, emissivity, and selective solar efficiency for embodiments of ALD Mo:Al$_2$O$_3$ nanocomposite films were calculated using Eqns. 1-3 and are plotted in FIG. 8. The thermal emissivity is lowest and the selective solar efficiency is highest for the films prepared using single ALD Mo cycles in the 10% Mo cycle percentage films. We attribute t behavior in FIG. 8 to the increase in IR absorption with the number of successive Mo cycles. The results were similar for a set of ALD W:Al$_2$O$_3$ nanocomposite films where the W cycle percentage constant at 25%, but the number of ALD W cycles performed in succession was varied to be 1, 3, 4, 5 and 7. The thermal emissivity was lowest and the selective solar efficiency was highest for the films prepared using single ALD W cycles in the 25% W cycle percentage films.

Spectroscopic ellipsometry was used to investigate the effect of composition on the optical constants (refractive index and extinction coefficient) of the ALD W:Al$_2$O$_3$ nanocomposite films. For materials comprised by two or more constituents or phases, it is often profitable to use effective medium theories such as those proposed by Maxwell-Garnett (M-G) and Bruggeman to obtain good approximations for the properties of the mixture, such as the volume fractions. The Bruggeman effective medium approximation (EMA) was used for the nanocomposite films with Al$_2$O$_3$ as the matrix modeled using a Cauchy dispersion model and W as the inclusion modeled using a B-spline formula. These models require accurate measurements of the optical constants for the individual constituent phases. Therefore, ellipsometric data was first analyzed for pure Al$_2$O$_3$ films using a Cauchy dispersion function, and for pure W using a Kramers-Kronig consistent Bspline function to obtain the optical constants for these films. The quality of the fitting was verified by noting that the mean squared error (MSE) for several sets of films having the same W % and increasing thickness was <3.

A differentiating feature between the materials described here and previous cermet materials is that the optical properties for the ALD W:Al$_2$O$_3$ nanocomposite films with W %<50 are well fit using an EMA model, but for W:Al$_2$O$_3$ cermets prepared by physical vapor deposition (PVD) this was not the case. A key difference is that the 1-2 nm particles in ALD films are substantially smaller than those seen in some PVD cermets. Consequently, the main requirement for Bruggeman's EMA mode, (homogeneity at a scale below optical wavelengths) is better satisfied for embodiments described herein. The practical implication is that the broad optical tunability does not come at the expense of increased scattering.

A second important advantage of the ALD W:Al$_2$O$_3$ is that, as scattering is not important within the optical layers, standard optical simulation software can be used to optimize the optical properties of the film. In particular, this allows one to couple the mesostructure and the nanostructure design components to predict and identify the best possible material for the required application.

Figure 5:
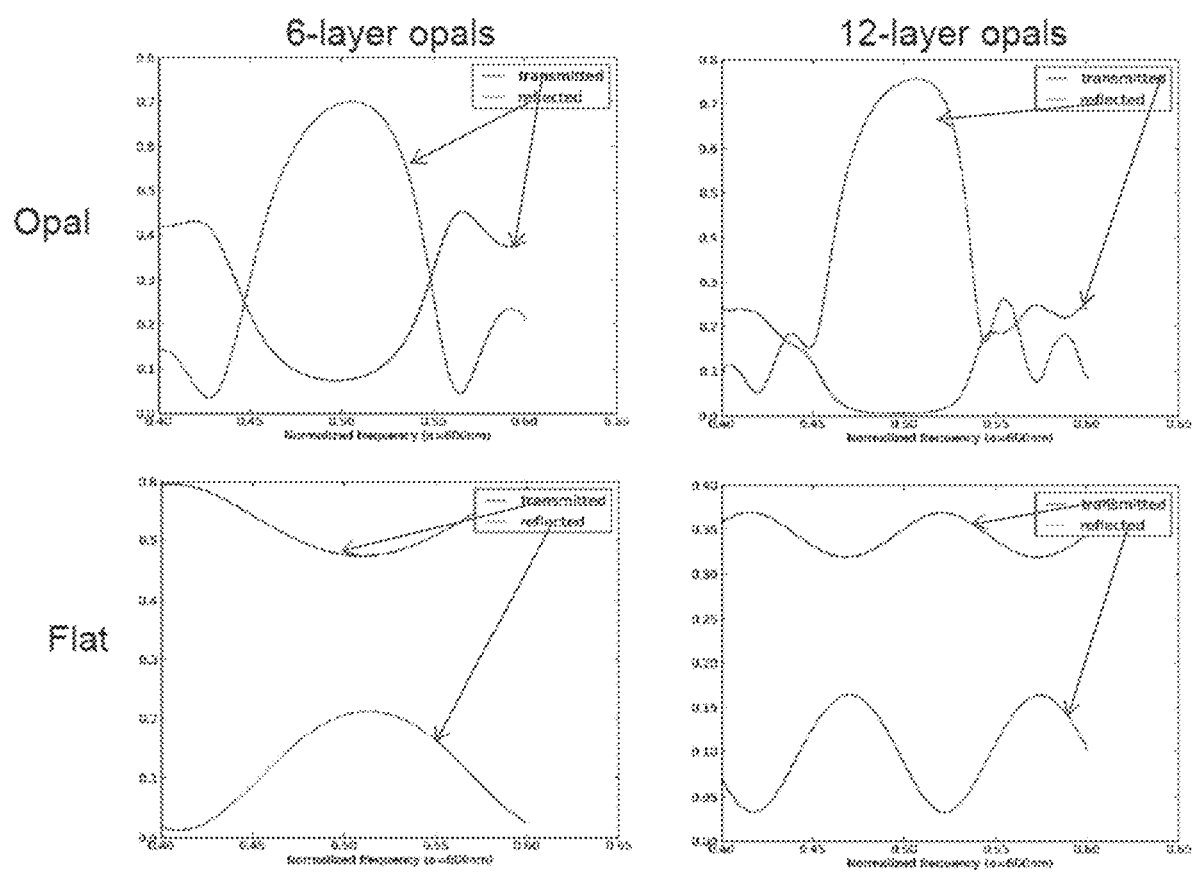
FIG. 5 is a comparison between the optical properties of a standalone flat and mesostructured ALD $W:Al_2O_3$ nanocomposite coating, showing the impact of meso-nano tunability on the optical properties of the film. The figure refers to a nanomaterial obtained with 40% W cycles. Top: coating with additional mesostructure in the form of an inverse opal with 6 (top left) and 12 (top right) layers. Bottom: figures show predicted T and R values for the same films in the absence of the opal structure (i.e. flat, dense films).
Figure 6:
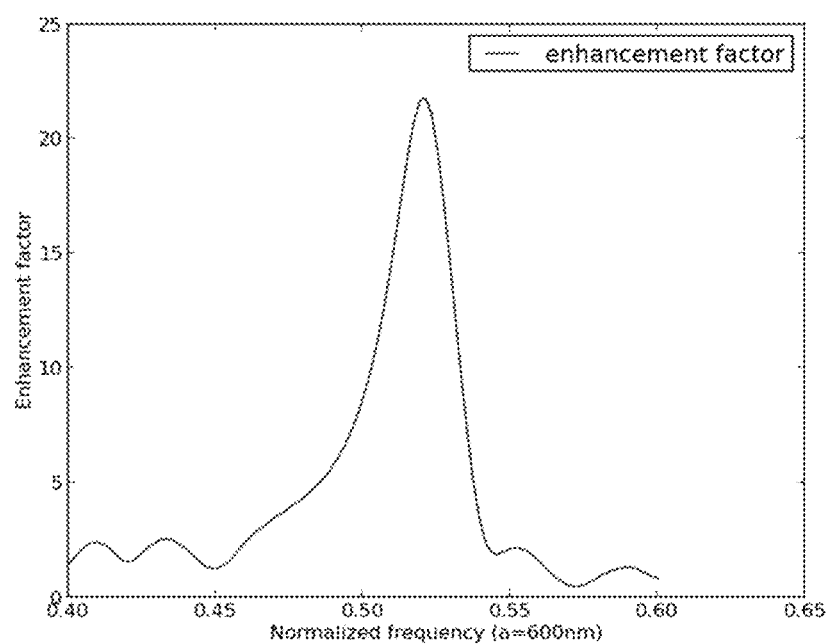
FIG. 6 is a graph of enhancement factor between a standalone flat, and a mesostructured coating

An example of the advantages of the control of the mesostructure coupled to the ability to create nanocomposite materials that are optically homogeneous is shown in FIG. 5. Predicted T and R values for ALD W:Al$_2$O$_3$ nanocomposite with 40% W cycles deposited into opal structures having 6 (top left) and 12 (top right) layers. Bottom figures show predicted T and R values for the same films in the absence of the opal structure (i.e. flat, dense films). In each case, the upper graphs show the calculations for the opal structures, while the lower graphs show the results for corresponding flat samples (i.e. the same volume of ALD nanocomposite film, but without the void space that defines the opal structure). The figures demonstrate that the opal structure enhances the reflectivity by 3.5× for the 6-layer opal, and by 7.5× for the 12-layer opal, at the normalized frequency value of 0.5 corresponding to a wavelength of 1200 nm. These results demonstrate a methodology for computing the photonic enhancement, and that the IR reflectivity of the refractory solar selective coatings can be enhanced using the opal structure.

The ability to efficiently couple the nano and mesoscales to design better absorbers is enabled by the extremely small particle sizes of the nanocomposite materials prepared using the method described above.

Figure 2:
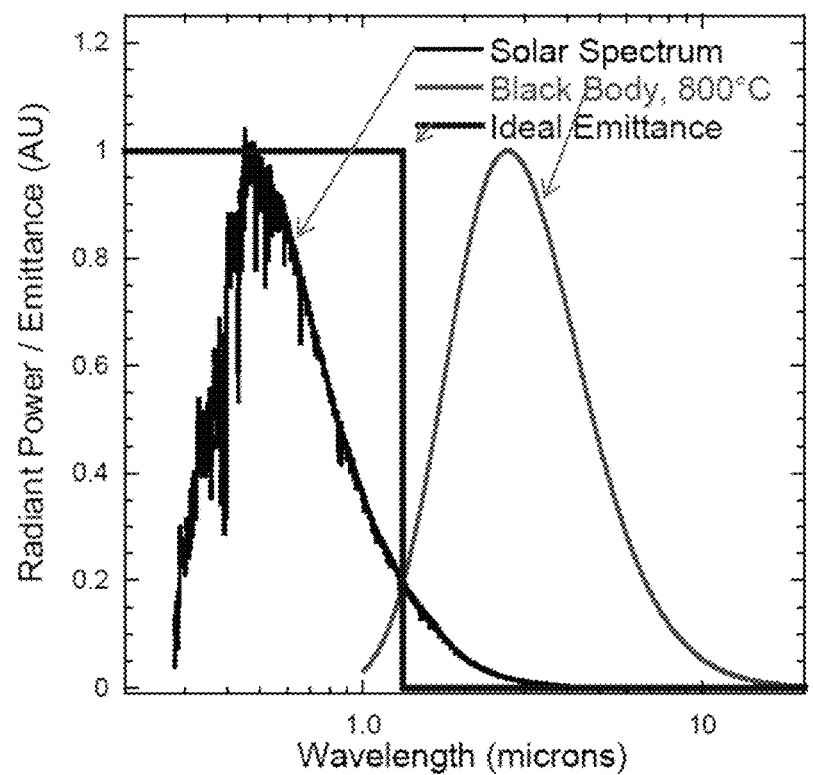
FIG. 2 is a graph of ideal emittance of a selective absorber coating: none of the state of the art materials can meet this requirement while remaining stable at 800 C.
Figure 3:
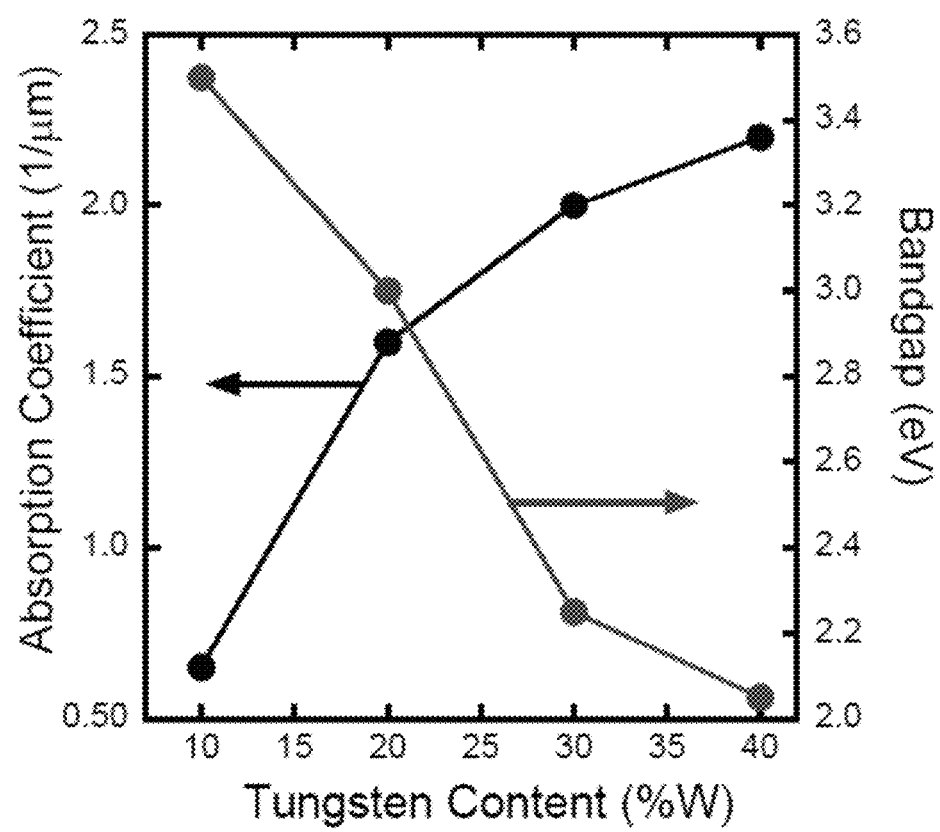
FIG. 3 illustrates a graph showing tunability of the optical properties of $W:Al_2O_3$ used as an example of tunable resistance coatings.
Figure 4:
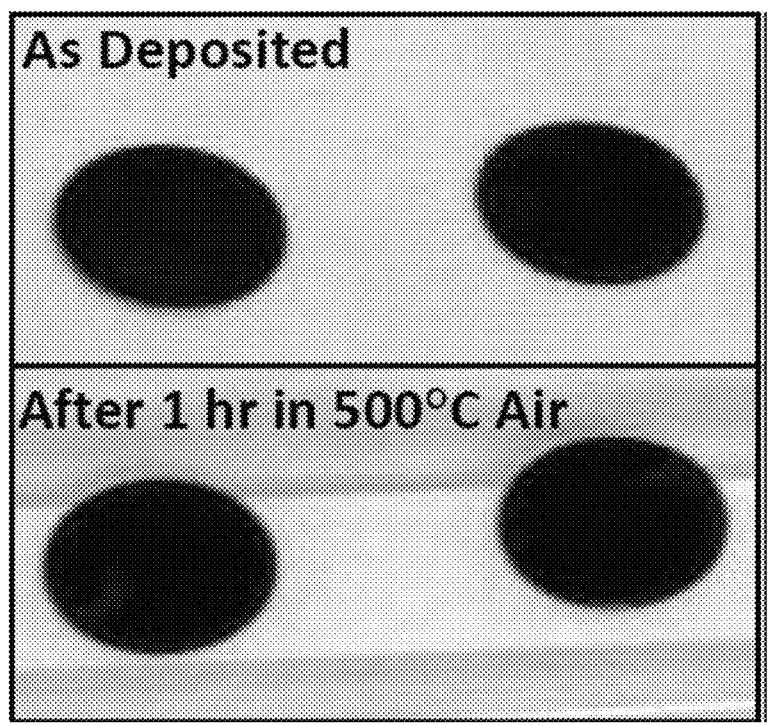
FIG. 4 shows $W:Al_2O_3$ nanostructured materials deposited in a high surface area mesostructured materials consisting of millions of 200 nanometer diameter circular pores that are 60 microns deep. The annealing resistance of the films surpasses that of conventional cermet materials.

The advantages of embodiments of the absorber coating can be understood by considering a simplified formula for the thermal efficiency of selective absorber coatings, η:

$$\eta = \alpha - \varepsilon A T^4 \quad \text{(Eq. 1)}$$

where α and ε are the wavelength-dependent absorptivity and emissivity of the coating, respectively, T is the receiver temperature, and A is a constant (convective losses are neglected in this discussion). For maximum thermal efficiency α=1 over the solar spectrum and ε=0 in the infrared (FIG. 2). Carnot's theorem dictates that concentrated solar plants become more efficient at higher operating temperatures, but this places intense demands on the absorber coating: (1) Low emissivity becomes critical due to the T$^4$ term in Eq. 1; (2) The black body curve shifts to shorter wavelengths and overlaps the solar spectrum (FIG. 2); (3) The coating degrades through sintering and oxidation; (4) The magnitude of diurnal temperature cycling increases, imposing greater thermomechanical stresses that delaminate and disintegrate the coating.

Coatings described herein address each of these demands: (1) By controlling the photonic structure manipulating the cutoff wavelength and reduce the emissivity. (2) by including in the nanocomposite coatings conducting 1-2 nm nanoparticles embedded in an amorphous matrix and tuning the size, spacing, and composition of the nanoparticles in the composite lends exquisite control over the a and ε spectra. (3) The absorbing nanoparticles are comprised of refractory carbides and oxides with extreme tolerance to oxidizing conditions at high temperatures. (4) The mesoporous structure lends extreme stability for high temperature cycling, demonstrated under vacuum conditions up to 1500° C.

In a preferred embodiment the absorber coatings are used in a concentrated (concentration ratio greater than 10, or in a high concentration application with a ratio greater than 1000) solar thermal application, such as a "power tower" installation (FIG. 1A). However, embodiments of the absorber coatings may be used with other receiving systems such as concentrated thermal trough, photovoltaic, and thermoelectric systems.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A photonic construct comprising:
   a photonic coating on a substrate, the photonic coating comprising a plurality of photonic coating nanoparticles having sizes between 100 nm and 2000 nm, the photonic coating having a mesoporous structure; and
   an optical coating deposited on the photonic coating and infiltrating the mesoporous structure, the optical coating comprising a cermet having a plurality of optical coating nanoparticles consisting of Mo in a metallic state having sizes between 0.1 nm and 10 nm and an amorphous matrix of Al$_2$O$_3$, the optical coating comprising 10 ALD cycle percentage of Mo optical coating nanoparticles;
   wherein the photonic construct has a solar absorptivity ≥90% and an IR emissivity ≤0.05 at a temperature above 720° C.

2. The photonic construct of claim 1, wherein a solar efficiency solar absorptivity is ≥95% at a temperature above 720° C.

3. The photonic construct of claim 1, wherein the photonic construct has a solar absorptivity ≥90% and an IR emissivity ≤0.05 at a temperature above 800° C.

4. The photonic construct of claim 1, wherein the photonic construct has a solar absorptivity ≥90% and an IR emissivity ≤0.05 at a temperature above 1000° C.

5. The photonic construct of claim 1, wherein the photonic construct has a thermal emissivity of less than 0.1.

6. The photonic construct of claim 1, wherein the construct exhibits a levelized cost of electricity of equal to 6 ¢/kWhe at a temperature of greater than or equal to 720° C.

7. The photonic construct of claim 1 further comprising an adhesive substrate.

8. The photonic construct of claim 1, wherein the plurality of optical coating nanoparticles have sizes of 1 nm to 2 nm.

* * * * *